(12) United States Patent
Sabt et al.

(10) Patent No.: US 11,282,079 B2
(45) Date of Patent: Mar. 22, 2022

(54) METHOD FOR SECURING CONTACTLESS TRANSACTIONS

(71) Applicant: ORANGE, Paris (FR)

(72) Inventors: Mohamed Sabt, Caen (FR);
Mouhannad Alattar, Caen (FR);
Mohammed Achemlal, Caen (FR)

(73) Assignee: Orange, Paris (FR)

( * ) Notice: Subject to any disclaimer, the term of this patent is extended or adjusted under 35 U.S.C. 154(b) by 503 days.

(21) Appl. No.: 15/538,185

(22) PCT Filed: Dec. 17, 2015

(86) PCT No.: PCT/FR2015/053583
§ 371 (c)(1),
(2) Date: Jun. 20, 2017

(87) PCT Pub. No.: WO2016/102831
PCT Pub. Date: Jun. 30, 2016

(65) Prior Publication Data
US 2017/0330184 A1 Nov. 16, 2017

(30) Foreign Application Priority Data

Dec. 22, 2014 (FR) ...................... 1463119

(51) Int. Cl.
*G06Q 20/40* (2012.01)
*G06Q 20/32* (2012.01)
*G06Q 20/38* (2012.01)

(52) U.S. Cl.
CPC ......... *G06Q 20/401* (2013.01); *G06Q 20/327* (2013.01); *G06Q 20/3278* (2013.01);
(Continued)

(58) Field of Classification Search
CPC ............... G06Q 20/401; G06Q 20/327; G06Q 20/3278; G06Q 20/3823; G06Q 20/3829; G06Q 20/385; G06Q 2220/00
See application file for complete search history.

(56) References Cited

U.S. PATENT DOCUMENTS 6,233,565 B1 * 5/2001 Lewis .................... G06Q 20/00
705/26.1
9,432,339 B1 * 8/2016 Bowness ............. H04L 63/0838
(Continued)

FOREIGN PATENT DOCUMENTS

WO WO-02079911 A2 * 10/2002 ............. G06Q 20/14

OTHER PUBLICATIONS

Diffie-Hellman Key Exchange, Dec. 8, 2013, Wikipedia.org (Year: 2013).*

(Continued)

*Primary Examiner* — Neha Patel
*Assistant Examiner* — Nilesh B Khatri
(74) *Attorney, Agent, or Firm* — Haverstock & Owens, A Law Corporation (57) ABSTRACT

The invention relates to a method for securing a contactless service transaction, said service (11) being stored in the mobile terminal (10), said transaction involving the mobile terminal, a contactless reader (12) and a remote server (13), said server storing at least one piece of data and/or sensitive function of the service, said terminal comprising a security module (14), said method being characterised in that the terminal also stores a contactless security application (15) and that it comprises: receiving (E41) a first value ($\alpha$) for determining a session key; receiving (E49) a second value for determining a session key ($\beta$) and a first one-time password (OTPin); sending (E58) the second value for determining a session key and a message (MAC) for authen- (Continued)

ticating at least the first password, intended for being verified by the reader, said first and second determination values being used to calculate (E50, E61) a session key ($K_{sess}$) intended for being used to secure the exchanges.

8 Claims, 2 Drawing Sheets

(52) U.S. Cl.
CPC ....... *G06Q 20/385* (2013.01); *G06Q 20/3823* (2013.01); *G06Q 20/3829* (2013.01); *G06Q 2220/00* (2013.01)

(56) References Cited

U.S. PATENT DOCUMENTS

| | | | | |
|---|---|---|---|---|
| 9,491,261 | B1* | 11/2016 | Shagam | H04L 67/40 |
| 2005/0066057 | A1* | 3/2005 | Thorstensson | H04W 12/10 |
| | | | | 709/246 |
| 2009/0104888 | A1* | 4/2009 | Cox | G06Q 20/40 |
| | | | | 455/410 |
| 2009/0214028 | A1* | 8/2009 | Schneider | H04L 9/0844 |
| | | | | 380/44 |
| 2009/0313687 | A1* | 12/2009 | Popp | H04L 9/3236 |
| | | | | 726/9 |
| 2014/0236842 | A1* | 8/2014 | Salminen | G06Q 20/326 |
| | | | | 705/75 |

OTHER PUBLICATIONS

Pardis Pourghomi, "Trusted Integration of Cloud-based NFC Transaction Players", pp. 6-13.

Michael Roland, "Software Card Emulation in NFC-enabled Mobile Phones: Great Advantage or Security Nightmare?", Fourth International Workshop on Security . . . ,Jun. 18, 2012.

"A Smart Card Alliance Mobile & NFC Council White Paper", Host Card Emulation (HCE) 101, Aug. 2014, MNFCC-14002.

* cited by examiner

METHOD FOR SECURING CONTACTLESS TRANSACTIONS

The present invention relates to a method for securing contactless transactions.

A particularly useful application of the invention is to securing sensitive contactless services such as payment services on intelligent mobile terminals (or "smartphones" as they are known in English).

There are known contactless services on mobile terminals, for example payment services. Mobile terminals are usually equipped with a security element arranged to store a sensitive application, together with the user's sensitive data required for the execution of the application. Recently, the introduction of a card emulation environment (commonly referred to as HCE, for "Host Card Emulation") in intelligent mobile terminals has enabled sensitive contactless services to be provided independently of a security element. Such an environment enables the mobile terminal to act as a smart card. In an HCE architecture, the sensitive applications are installed and executed in the operating system of the mobile terminal which acts as the "host" (as it is known in English) of these applications. Such a solution has the advantage of facilitating the deployment and updating of services. This is because the execution and management architectures are simpler, requiring fewer technical components and involving fewer actors. However, it is known that applications on mobile devices and the operating system on which they depend do not offer the same level of security as applications based on a security element. In this case, other approaches to security are proposed.

One of the approaches used in the HCE version of the commercial implementation of the "Google Wallet" payment application offered by Google™ is that of storing the sensitive information of the application on a remote server in a cloud computing architecture (the English term "cloud" is commonly used). For example, sensitive identification and authentication information or bank account numbers are stored on the remote server. When the HCE payment application is executed between the mobile terminal and the contactless reader, the reader sends commands to the application hosted on the mobile terminal. Some commands are processed directly by the application on the mobile terminal, while other commands require sensitive data in order to respond to the reader. In this case, the HCE application contacts the remote server to obtain the sensitive data stored on the server. The purpose of storing the data on the remote server is to protect these data against attackers who may access the mobile terminal. The communication between the mobile terminal and the remote server hosting the sensitive data is based on the "TLS" (for "Transport Layer Security" in English) protocol, designed to protect the confidentiality and integrity of these data. It is important to note that the logic of the payment application is executed in the mobile device.

However, such a solution is vulnerable to a number of types of attack. For example, an attacker may steal the user's sensitive data. The data are stored on the remote server which is assumed to be secure, and are protected by the TLS protocol while being transmitted from the server to the mobile terminal. To create a secure channel, the TLS protocol needs identification and authentication data (or "credentials" as they are known in English) in order to authenticate the payment application at the server, so that the server can be sure that it is communicating with the correct application. These identification and authentication data are stored on the mobile terminal. An attacker may therefore steal these data and access the sensitive data stored on the server. The theft of authentication data is possible if the attacker has sufficient privileges.

A second example of an attack is the modification of the logic of the payment application. The payment application is executed in the mobile terminal, and therefore the data that it uses and the executed codes are present in the random access memory of the mobile terminal. An attacker who has access to modules for managing the memory of the terminal may not only read the sensitive data in memory but also overwrite some of the code loaded into the random access memory of the terminal. Thus, if the activation of the payment application requires the entry of a password, the attacker may overwrite the code so as to delete the instructions which request or verify the password. Thus the attacker may steal the user's mobile terminal and use the payment application without knowing the user's password.

One of the objects of the invention is to overcome some of the deficiencies and/or drawbacks of the prior art and/or to make improvements thereto.

To this end, the invention proposes a method for securing a transaction of a contactless service, said service being stored in a mobile terminal, said transaction involving the mobile terminal, a contactless reader and a remote server, said server storing at least one sensitive piece of data and/or function of the service necessary for the execution of the transaction, said terminal comprising a security module, said method being characterized in that the terminal also stores a contactless security application and in that it comprises the following steps, executed by the mobile terminal:

- a first value for determining a session key is received by the security application from the contactless reader,
- a second value for determining a session key and a first one-time password calculated by the server by means of a secret key shared with the security element are received from the server, said first one-time password being sent to the security module,
- the second value for determining a session key, and an authentication message for authenticating at least the first one-time password, are sent to the contactless reader, said authentication message being intended to be verified by the reader and said first and second determination values being used by the server and by the reader to calculate a session key, said key being intended to be used to secure the exchanges between the reader and the server.

Thus the method makes it possible to secure the communications link between the NFC reader and the remote server hosting the sensitive part of the contactless service, for example a bank account number, a data signature function, or the like, in the context of a payment service. There is mutual authentication between the security element and the remote server, and mutual authentication between the contactless reader and the remote server. The latter process ensures that the NFC reader negotiates with the correct remote server, and vice versa, during the establishment of the secure channel. The remote server is also assured that the terminal exchanging data with the contactless reader does indeed belong to the user whose data and sensitive functions are being handled during the current transaction. The presence of the security element ensures that the server is dialoguing with the correct user.

The integrity of the data transmitted between the mobile terminal and the reader is assumed. This is because a man-in-the-middle attack would be practically impossible, owing to the short distance between the terminal and the reader during a transaction. On the other hand, the choice has been made to establish a secure channel between the contactless reader and the remote server. This is to ensure that the security problems that frequently result from attacks on the mobile terminal cannot thus affect the exchanges between the reader and the remote server.

According to the method described here, commands received from the reader which are concerned with sensitive information, or which require the execution of sensitive functions, are executed directly by the remote server, and not by the contactless application resident on the mobile terminal. An attack is therefore more difficult to make, since the security measures taken to protect a server are usually dependable. This avoids any attacks of the kind usually made against the secure channel linking the contactless application to the remote server.

According to an exemplary embodiment, the method comprises a step of obtaining an authentication status from the security module, said status being obtained by comparing the first one-time password with a second one-time password calculated by the security module by means of the secret key shared with the server, the status being positive if the first and second one-time passwords are identical, the status also being used by the security element for calculating the authentication message.

The authentication status, obtained by the security module, ensures the authentication of the server at the security module. This status, which is then transmitted to the remote server, assures the server of the success of the mutual authentication between the security module and the server.

According to an exemplary embodiment, the method comprises a step of receiving from the reader, and retransmitting to the server, a secret value obtained by encrypting the authentication message and the authentication status by means of the session key.

The secret value obtained by encrypting the authentication message and the authentication status by means of the session key is intended to reduce the possibility of a relay attack. This is because the session key used to calculate the secret value is known only to the reader and the server. A remote attacker cannot request the reader to encrypt an authentication message that he has generated. This is because it is assumed that the NFC reader must be sufficiently close to the mobile terminal during the transaction, making this kind of attack difficult if the attacker has not taken control of the security application.

In an exemplary embodiment, the method further comprises the following steps:
receiving from the server a first signature calculated on the basis of at least one identifier of the security element and a signature key belonging to the server,
sending said signature to the reader,
receiving from the reader, and retransmitting to the server, a second signature calculated on the basis of at least the identifier of the security module and a signature key belonging to the server.

The integrity of the data exchanged is guaranteed by the sending of the data signatures, generated by the server for use by the reader on the one hand, and by the reader for use by the server on the other hand.

In an exemplary embodiment, the one-time password is calculated by encrypting, by means of a secret key shared by the security element and the server, a counter which is incremented at each session.

The use of a secret key shared by the security element and the server for generating the one-time password ensures the security of this password, which is transmitted from the server to the security application, and then from the security application to the security element.

Advantageously, the method comprises, if the exchanges between the reader and the server are encrypted by means of the session key, the following steps:
receiving from the reader an information message belonging to the service and intended for a user of the terminal, said message having been sent from the server to the reader,
sending said message to the service, said message being displayed on a user interface of the terminal.

If the server sends a message to be displayed on an interface of the mobile terminal for the attention of the user, this message is routed along the secure channel, via the contactless reader, to the security application which retransmits it to the contactless service. Thus the sending of messages by the server is secured at all times.

Advantageously, the method comprises, when the exchanges between the reader and the server have been encrypted by means of the session key, the following steps:
receiving from the service a piece of data input by the user, said piece of data having been requested by the server,
sending the input piece of data to the contactless reader, said input piece of data being intended for transmission to the server.

Similarly, if the service user is requested to input a piece of service data on the terminal, for example a personal identification code, this data is routed to the remote server via the security application, which retransmits it to the NFC reader so that it travels along the secure channel to the server. The sending of information from the service to the server is therefore secured at all times between the reader and the server.

The invention also relates to a mobile terminal adapted for securing a transaction of a contactless service, said terminal storing said contactless service, said transaction involving the mobile terminal, a contactless reader and a remote server, said server storing at least one sensitive piece of data and/or function of the service necessary for the execution of the transaction, said terminal comprising a security module, said terminal being characterized in that it stores a security application and in that it further comprises:
first receiving means, arranged to receive a first value for determining a session key from the contactless reader,
second receiving means, arranged to receive from the server a second value for determining a session key and a first one-time password calculated by the server by means of a secret key shared with the security element,
sending means, arranged to send to the contactless reader the second value for determining a session key and an authentication message for authenticating at least the first one-time password, said authentication message being intended to be verified by the server and said first and second determination values being used by the server and by the reader to calculate a session key, said key being intended to be used to secure the exchanges between the reader and the server.

The invention also relates to a system for securing a transaction of a contactless service, comprising a mobile terminal as described above, and:
a contactless reader adapted for communicating with the security application of the mobile terminal, and comprising:
sending means arranged to send the first value for determining the session key to the security application, receiving means arranged to receive the second value for determining the session key, means for calculating the session key, arranged to calculate the session key on the basis of the first and second values for determining the session key, a remote server, adapted for storing at least one sensitive piece of data and/or function of the payment application, and comprising:

sending means arranged to send the first value for determining the session key to the mobile terminal, calculation and sending means, arranged to calculate the first one-time password and send it to the security application, calculation means arranged to calculate the session key, receiving and verification means arranged to receive and verify the authentication message.

The invention also relates to a computer program which is stored on a data medium and can be loaded into the memory of a mobile terminal, the program comprising code instructions for executing the steps of the method for securing a transaction of a contactless service according to the invention when the program is executed on said mobile terminal.

The invention also relates to a data medium on which the program described above is recorded.

Other characteristics and advantages of the present invention will be more clearly understood from the description and the attached drawings, in which.

Figure 1:
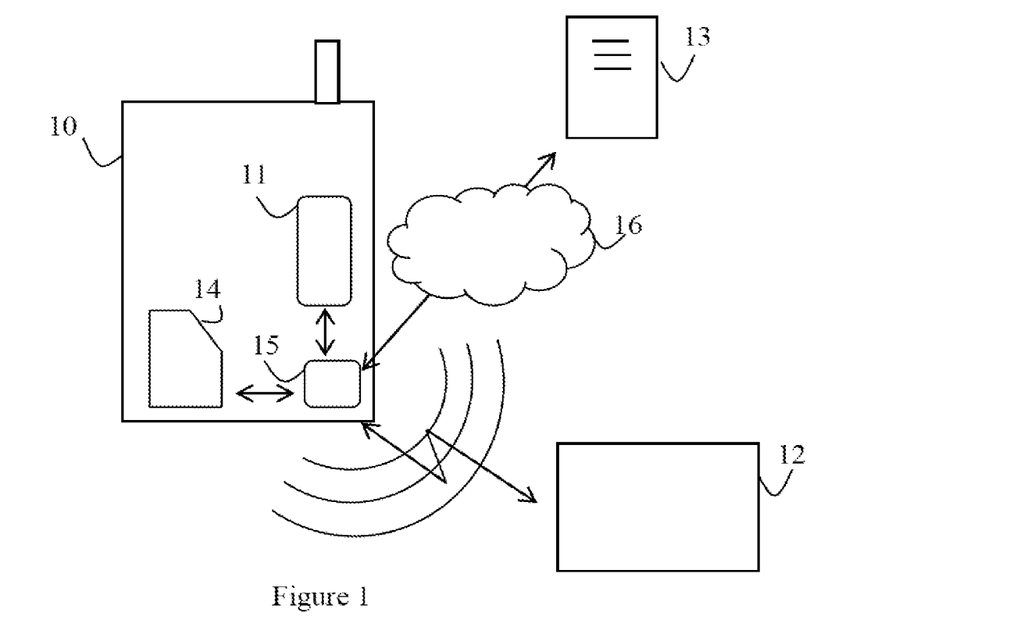
FIG. 1 is a schematic representation of an architecture adapted for the execution of the steps of a method for executing a contactless transaction according to a first exemplary embodiment of the invention.

An architecture adapted for the execution of the steps of a method for executing a contactless transaction, according to an exemplary embodiment of the invention, will now be described in relation to FIG. 1.

A user (not shown in FIG. 1) has an intelligent mobile terminal (or "smartphone" in English) 10, adapted for the execution of the contactless services.

The mobile terminal 10 stores a contactless application 11, for example a payment service. More precisely, the mobile terminal 10 stores a payment module comprising code instructions for executing steps of the payment application that are executed by the mobile terminal 10. The payment application 11 is stored and executed in the operating system of the terminal 10. The mobile terminal 10 also stores a security application 15, for managing the negotiation of security parameters between the NFC reader 12 and the server 13 by means of the security element 14 in the context of the execution of the payment application 11. The security parameters negotiated in this way are intended to establish a secure end-to-end connection between an NFC reader 12 and a remote server 13. The security application 15 is able to cut off the exchanges between the NFC reader 12 and the payment application 11. The security application 15 is installed in the operating system of the terminal 10. It is an application in conformity with the HCE architecture. In this respect, the security application 15 is adapted to communicate with the NFC reader 12. This security application 15 is also adapted to communicate with a security element 14. It is common to all the sensitive applications of the mobile terminal 10 which require the installation of end-to-end security between the NFC reader and a remote server, according to the method for securing a contactless transaction as described above.

A remote server 13 is intended to store sensitive data and functions of the payment application for a user subscribing to the service. Examples of sensitive data are a bank account number, identification and authentication data, and the like. A sensitive function is, for example, a function of inputting a personal identification code (or "PIN" code, for "Personal Identification Number"). These data and the execution of the sensitive functions are required by the NFC reader 12 during the execution of the payment application 11, in order to complete the payment transaction successfully. The transfer of the sensitive data and functions to the server 13 is intended to ensure a certain level of security for the payment application stored in the mobile terminal. The remote server 13 is, for example, a computer server forming part of a computing architecture of the "cloud" type (the English term "cloud computing" is commonly used). The mobile terminal 10 and the remote server 13 communicate, for example, via the internet 16.

The NFC reader 12 is located at a point of sale (the commonly used term is the English term "POS", for "Point Of Sale"). It is linked to a merchant server (not shown) which stores a payment module comprising code instructions for executing the steps of the payment application that are executed by the merchant server. For the sake of clarity, only the NFC reader 12 is shown in the figure. It is assumed that the functions of the merchant server are executed in the NFC reader 12. From the point of view of the NFC reader 12, and in the HCE context, the payment application 11, coupled to the security application 15 of the mobile terminal 10, appears as a payment card.

It is also assumed that the server 13 and the NFC reader 12, respectively, store secret signature keys $Ksig_{Serv}$ and $Ksig_{Reader}$ respectively, intended to be used by a signature algorithm to ensure the integrity of signed transmitted information.

The mobile terminal 10 also comprises a security element 14 of the type known as "UICC" (from the English "Universal Integrated Circuit Card"), or "eUICC" (for "embedded"), for example a "(U)SIM" (from the English "(Universal) Subscriber Identity Module") card of the SIM card type. The security element 14 is arranged to store sensitive data such as secret keys, authentication codes, and the like. It is assumed that the security element 14 and the remote server 13 share the knowledge of a secret key $K_s$. The secret key $K_s$ has, for example, been pre-installed in the security element 14 and in the remote server 13 in a preliminary configuration phase executed when the user subscribed to one or more sensitive services offered by a service provider which offers the payment application 11, among others. This installation has been carried out by a known method which is not detailed here, for example by means of an "OTA" (for "Over The Air") procedure. The secret key $K_s$ belonging to the user who is the holder of the mobile terminal 10 is intended to be used by the security element 14 and by the server 13 to generate the same one-time password that is to be used in mutual authentication between the server 13 and the security element 14.

Figure 2:
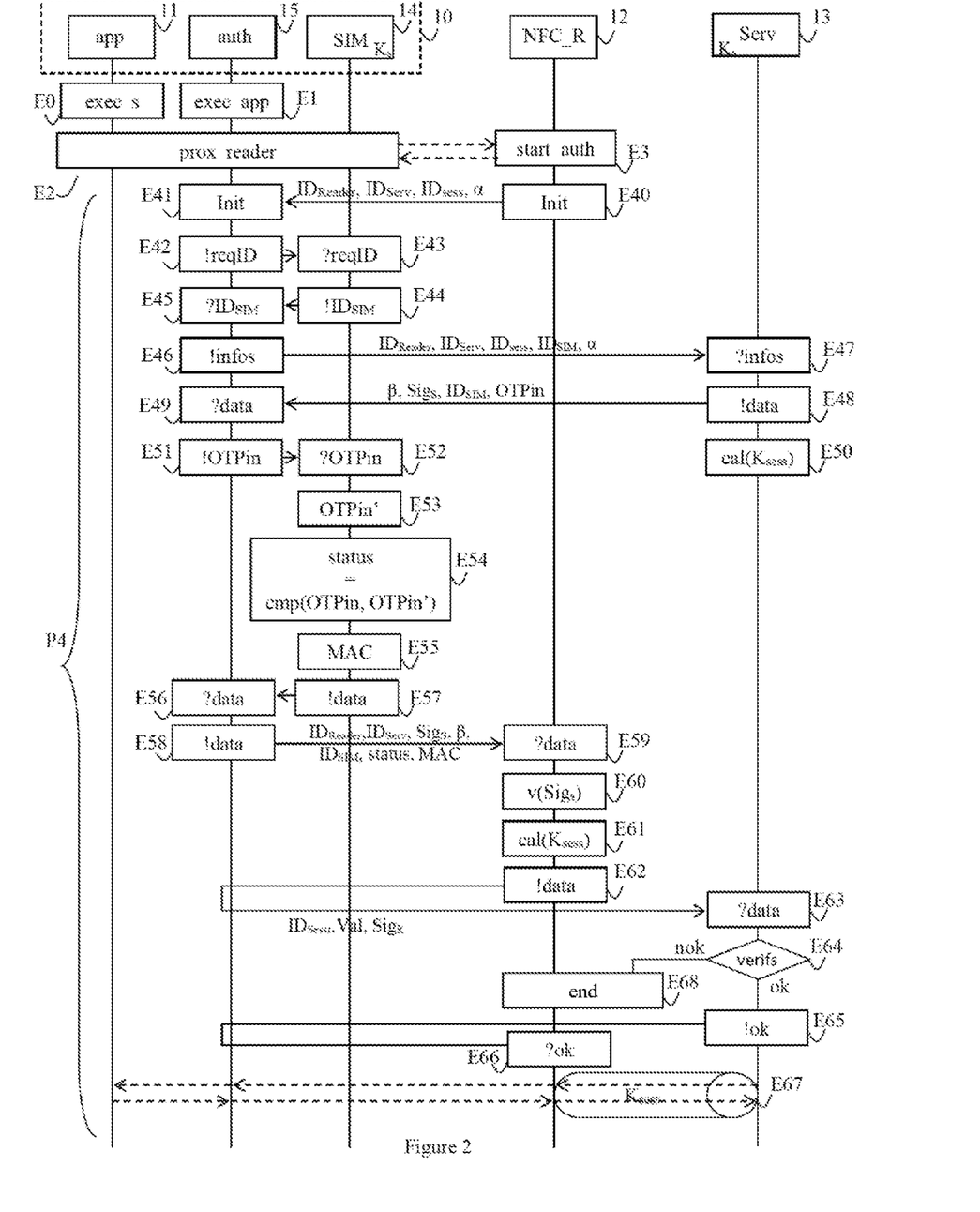
FIG. 2 shows the steps of a method for executing a contactless transaction according to a first exemplary embodiment of the invention.

The steps of a method for securing a contactless transaction, according to a first exemplary embodiment, will now be described in relation to FIG. 2.

In an initial execution step E0, the user starts the execution of the payment service 11 stored in his mobile terminal 10. For example, the user selects the payment service 11 from a menu.

In a subsequent step E1 of activating the security application, the payment service 11 starts the execution of the security application 15 stored in the mobile terminal 10. The security application 15 is common to all the contactless services of the mobile terminal 10. Its execution may be started only by another contactless service of the mobile terminal 10. The security application 15 is adapted to manage the negotiation of security parameters between the remote server 13 and the NFC reader 12 in order to establish a secure channel between the NFC reader 12 and the server 13, so as to ensure the security of end-to-end exchanges between these two entities. It is adapted to communicate with the NFC reader 12. In this respect, the integrated security application 15 is an application conforming to the HCE architecture. It is seen as a contactless card by the NFC reader 12.

In an approach step E2, the user brings his terminal 10 toward the NFC reader 12 in order to perform the payment transaction.

In another exemplary embodiment, the user brings his mobile terminal 10 toward the NFC reader 12 in the execution step E0. This initiates the sending of first commands to the security application 15 by the NFC reader 12. The commands initiate the automatic activation of the contactless application 11 on the mobile terminal 10. In this case, steps E1 and E2 are not executed.

In a step E3 for starting the authentication, the NFC reader 12, which has detected the presence of the security application 15 launched on the terminal 10, causes three-way authentication to be performed between the NFC reader 12, the remote server 13 and the security element 14.

The three-way authentication is executed in a following authentication phase P4. It is described here in the context of the known Diffie-Hellman protocol for key exchange, designed to enable the NFC reader 12 and the remote server 13 to share a session key $K_{sess}$, in order to secure the exchanges between these two entities. The invention is not limited to the Diffie-Hellman method. Another key exchange method may be used.

In an initial authentication step E40, the NFC reader 12 sends to the security application 15 an identifier $ID_{Reader}$, an identifier of the remote server 13 $ID_{Serv}$ with which it wishes to establish a secure session, a session identifier $ID_{Sess}$ for the current session, and a public element a designed to be used in the key exchange method to generate the session key $K_{sess}$. α is a first value for determining the session key $K_{sess}$. In a known way, according to the Diffie-Hellman protocol, the public element α is calculated by the NFC reader 12 by means of a group generator g and a value p used to exchange the numbers according to a modulo. For example, $\alpha=g^a$ mod p, where a is a value generated in a random manner by the NFC reader 12. This information is received by the secure application 15 in a reception step E41.

In a subsequent step E42 of interrogation of the security element, the security application 15 sends an identifier request to the security module 14 in order to obtain an identifier $ID_{SIM}$ of the security element 14. This identifier $ID_{SIM}$ is, for example, a public "MSISDN" number (from the English "Mobile Station ISDN Number"), or the user's "known to the public" number. The identifier $ID_{SIM}$ is intended to identify the user of the mobile terminal 10 at the remote server 13, and to enable the latter to select the secret key Ks that it shares with the security element 14. In another exemplary embodiment, the identifier $ID_{SIM}$ may be defined initially by the server 13 and stored in the security element 14 in a phase of subscription to the service. In another example, the identifier $ID_{SIM}$ may vary at each session and may be calculated at the remote server 13, on the one hand, and at the security element 14 on the other hand, on the basis of the same initial data and a counter incremented at each service session. The identifier request is received by the security element 14 in a reception step E43.

The security element 14 sends its identifier $ID_{SIM}$ in a response step E44. The identifier $ID_{SIM}$ is received by the application 15 in a reception step E45.

In a step E46 of retransmission, the security application 15 sends all the information that it has received from the NFC reader 12 in step E41 and from the security element 14 in step E45 to the remote server 13. The security application 15 identifies the server 13 on the basis of the identifier $ID_{Serv}$. The information is sent, for example, via the internet. The identifier $ID_{Serv}$ of the server 13 is, for example, an internet address, a URL, or the like. In other words, the security application 15 sends ($ID_{Reader}$, $ID_{Serv}$, $ID_{Sess}$, α, $ID_{SIM}$) to the server 13. This information is received by the server 13 in a reception step E47.

In a subsequent response step E48, the server 13:
- calculates a second public element β to be used in the Diffie-Hellman key exchange protocol. For example, $\beta=g^b$ mod p, where b is a value generated in a random manner by the server 13;
- generates a numeric signature $Sig_S$ for the data received from the integrated application 15 in reception step E47 and from the second public element β. In other words, the server 13 signs ($ID_{Reader}$, $ID_{Serv}$, $ID_{Sess}$, α, $ID_{SIM}$, β), using a secret signature key $Ksig_{serv}$ known only to the server 13. The signature is intended to ensure the integrity of the received data and of the second public element β;
- generates a one-time secret OTPin. In an exemplary embodiment, the secret OTPin is intended to be used solely for a current authentication between the server 13 and the security element 14. In an exemplary embodiment, the one-time secret OTPin is obtained by encrypting, by means of the secret key $K_s$ shared between the server 13 and the security element 14, a value resulting from the concatenation of the identifier of the security element $ID_{SIM}$, from a counter value incremented at each new service session, and from a check value (the commonly used term is the English term "checksum"). The counter is also known to the security element 14 and is initialized to the same value.

These elements are sent by the server 13 to the security application 15 at the end of the response step E48.

They are received by the security application 15 in a reception step E49.

In a key calculation step E50, the server 13 calculates the session key $K_{sess}$ on the basis of the session key determination values α and β. Thus, according to the Diffie-Hellman protocol, the session key $Ksess=\alpha^b$ mod p, where a has been received from the reader via the security application 15 and where b and p have been used to calculate β.

In a subsequent step E51 for sending the one-time secret, the integrated application 15 sends the one-time secret OTPin to the security module 14. It is received by the security element 14 in a reception step E52.

On receiving the one-time secret OTPin, the security element 14 generates, in a secret generation step E53, a second one-time secret OTPin', on the basis of the same data as those used by the server 13, that is to say on the basis of the secret key $K_s$ that it shares with the remote server 13, the value of the counter, and the check value.

In a comparison step E54, the security element 14 compares the first one-time secret OTPin received from the security application 15 with the second one-time secret OTPin' that it has calculated. The result of this comparison corresponds to an authentication status status. This is because, if the one-time secret OTPin calculated by the server 13 is equal to the second one-time secret OTPin' calculated by the security element 14, this means that the authentication of the server 13 at the security module 14 has been successful; in this case, the status status, is positive. In the contrary case, that is to say if the first and second secrets are different, the authentication of the server 13 at the security element 14 has failed; in this case, the authentication status status is negative. It should be noted that the transaction is not terminated if the authentication status status is negative. This is because the remote server is responsible for making the decision to stop the transaction in progress, since it is the only party that can verify the integrity of the authentication status status.

In a subsequent step E55 for generating and sending an authentication code, the security element 14 generates an authentication message MAC for a set of data comprising the one-time password OTPin, the session identifier $ID_{sess}$ and the authentication status status. For example, it applies the HMAC algorithm (from the English "Keyed-hashed Message Authentication Code") to this set of data, and calculates $HMAC_{Ks}$ (OTPin, IDsess, status) by means of the secret key $K_s$ that it shares with the remote server 13.

In a subsequent sending step E58, the security application 14 sends the authentication value MAC and the authentication status status to the security application 15. The value MAC and the status status are received by the security application in a reception step E57.

In a data sending step E58, the security application 15 sends to the NFC reader 12 the identifier of the reader $ID_{Reader}$, the identifier of the server $ID_{Serv}$, the identifier $ID_{SIM}$ of the security module 14, the second public element $\beta$, the signature $Sig_S$ received from the server 13 in step E49, the authentication status status and the authentication code MAC received in step E57. These data are received by the reader 12 in a reception step E59.

In a signature verification step E60, the NFC reader 12 verifies the signature $Sig_S$ by means of the public key associated with the server's signature key $Ksig_{Serv}$.

In a session key calculation step E61, the NFC reader 12 calculates the session key $K_{sess}$ on the basis of the first and second public elements $\alpha$ and $\beta$. According to the Diffie-Hellman key exchange method, the session key $Ksess=\beta^{\alpha}$ mod p.

In a subsequent sending step E62, the NFC reader 12 sends to the remote server 13, via the security application 15:

the identifier of the current session $ID_{sess}$, a secret value Val, obtained by encrypting the concatenation of the authentication code MAC and of the authentication status status by means of the session key $K_{sess}$. In other words, $Val=Enc_{Ksess}(MAC\|status)$. This secret value Val is intended to reduce the possibility of a relay attack. This is because the value is obtained by encryption by means of the session key $K_{sess}$ which is calculated by the reader 12 on the one hand, and by the server 13 on the other hand. A remote attacker cannot request the reader to encrypt an authentication message that he has generated. This is because it is assumed that the NFC reader must be sufficiently close to the mobile terminal 10 during the transaction, making this kind of attack difficult if the attacker has not taken control of the security application 15;

a signature $Sig_R$ obtained by signing $ID_{reader}$, $ID_{Serv}$, $ID_{SIM}$, $ID_{Sess}$, $\alpha$ and $\beta$ by means of a secret key $KSig_{Reader}$ belonging to the reader. The purpose of this signature is to assure the server that the NFC reader 12 has received and sent the correct information.

This information, relayed by the security application 15, is received by the server 13 in a reception step E63. It should be noted that the communications between the reader 12 and the server 13 pass through the security application 15 in all cases.

In a verification step E64, the server 13 verifies the received signature $Sig_R$ by means of the public key associated with the secret key $Ksig_{Reader}$ of the NFC reader 12, in order to authenticate the NFC reader 12. It also verifies the authentication message MAC to ensure that the one-time secret OTPin and the authentication status status have not been altered. It also verifies that the authentication status status is positive, which indicates that the authentication with the security element 14 has been successful. The verification of the authentication message MAC enables the server 13 to authenticate the security module 14. Thus, at this stage, if the authentication status status is positive, the mutual authentication takes place between the security element 14 and the remote server 13. The verification of the signature of the message $Sig_R$ enables the server 13 to authenticate the reader 12.

In a first case, in which the verifications are conclusive (the "ok" branch in FIG. 2), the server 13, in a confirmation step E65, sends a confirmation message to the NFC reader 12 via the security application 15, indicating that everything is correct. The confirmation message is received by the NFC reader 12 in a reception step E66. From this instant onward, and for the current session $ID_{sess}$ the exchanges between the server 13 and the NFC reader 12 take place via a secure channel, using the session key $K_{sess}$ in a communication step E67. In a second case, in which one of the verifications is negative (the "nok" branch in FIG. 2), the server 13 sends a failure message to the NFC reader 12 in an end step E68, indicating that the transaction is refused.

In the communication step E67, the server 13 may send a message to the mobile terminal 10 in the context of the execution of the payment service 11. For example, the server sends an information message for the attention of the user, or a message requesting the user to input a piece of data. In this case, the server 13 sends this message to the contactless reader 12, via the secure channel. The reader 12 transmits this message to the security application 15, which in turn transmits it to the payment service 11 of the terminal 10, as shown by the arrows in dotted lines.

Similarly, if the service requires the user to input a piece of data, for example a personal identification code (or "PIN" code, for "Personal Identification Number" in English), then the code, having been input by the user, is transmitted by the payment service 11 to the security application 15, which in turn transmits it to the NFC reader 12.

The NFC reader 12 then sends the PIN code to the server 13 via the secure channel Thus the exchange of data between the server and the service is always secure.

Thus the whole of the sensitive part of the payment application 11 is executed at the remote server 13. The payment application 11 located at the mobile terminal 10 is requested to inform the user or interact with him.

The method for securing contactless transactions is described here in the context of a payment service. The method is not limited to this type of service, and may be applied to any service which handles sensitive data and functions, such as contactless services relating to transport tickets, loyalty card management services, identification services, or the like.

Figure 3:
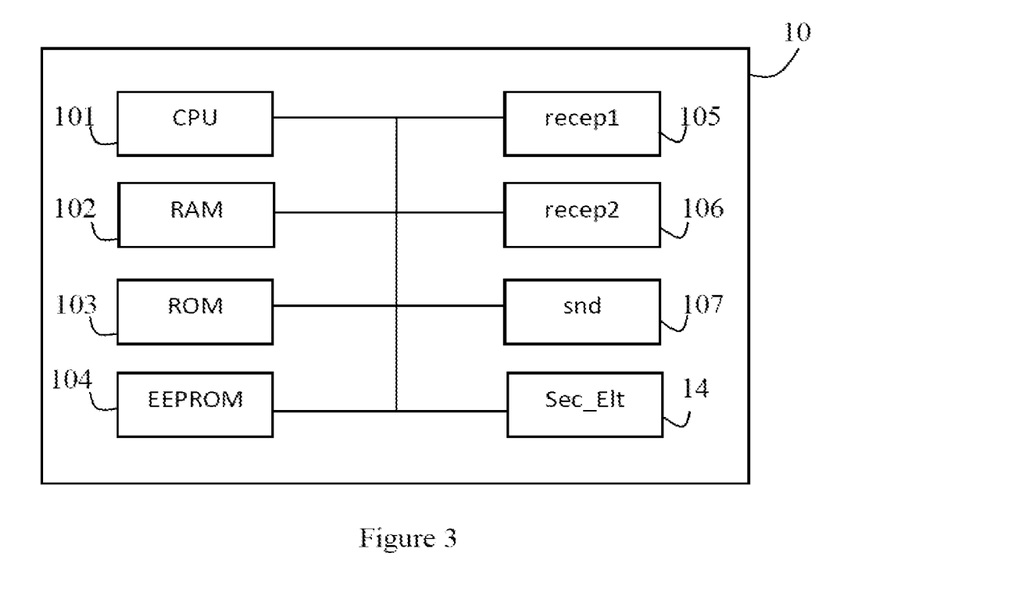
FIG. 3 is a schematic functional representation of a mobile terminal according to an exemplary embodiment of the invention.

A functional description of a mobile terminal 10 according to a first exemplary embodiment will now be given with reference to FIG. 3.

The mobile terminal 10 is an intelligent terminal, or smartphone as it is known in English, conforming to an HCE architecture. In conformity with the HCE architecture, the mobile terminal 10 emulates a contactless card, and hosts contactless applications in its operating system. The terminal 10 communicates directly with a contactless reader 12 located nearby, via contactless interfaces.

The mobile terminal 10 comprises:
- a processing unit 101, or "CPU" for "Central Processing Unit",
- a set of memories, including a volatile memory 102 and a read-only memory 103 of the type known as "ROM" (from the English "Read Only Memory") and a storage memory 104 which may be a flash memory or an "EEPROM" (for "Electrically-Erasable Programmable Read Only Memory"). The volatile memory 102 is arranged to execute code instructions, store variables, etc. The storage memory 104 is arranged to store data. In particular, the storage memory 104 stores contactless applications, for example the payment application 11 and the security application 15 which comprises code instructions for executing the steps of the method for securing a contactless transaction, as described above;
- a security element 14. In an exemplary embodiment, the security element 14 is a subscriber identity card, or SIM card. The security element 14 is arranged to store sensitive data such as secret keys, authentication codes, and the like. The security element 14 stores a secret key $K_s$, the knowledge of which it shares with the remote server 13 (not shown in FIG. 3). The secret key $K_s$ has, for example, been pre-installed in the security element 14 and in the remote server 13 in a preliminary configuration phase executed when the user subscribed to one or more services offered by the provider of the payment service 11. The secret key $K_s$ is intended to be used by the security element 14 and by the server 13 to generate a one-time password OTPin to be used in mutual authentication between the server 13 and the security element 14.

The mobile terminal 10 also comprises:
- a first receiving module 105, arranged to receive a first value ($\alpha$) for determining a session key from the contactless reader. The first receiving module 104 is arranged to execute step E41 of the method for securing a transaction described above,
- a second receiving module 106, arranged to receive from the server a second value for determining a session key $\beta$ and a first one-time password OTPin calculated by the server by means of a secret key $K_s$ shared with the security element. The second receiving module 106 is arranged to execute step E49 of the method described above;
- a sending module 107, arranged to send to the contactless reader the second value $\beta$ for determining a session key and the authentication message MAC generated on the basis of at least the first one-time password, said authentication message being intended to be verified by the server and said first and second determination values being used by the server and by the reader to calculate the session key $K_{sess}$, said key being intended to be used to secure the exchanges between the reader and the server. The sending module 106 is arranged to execute step E58 of the method described above. The mobile terminal 10 also comprises the following modules, not shown in FIG. 2:
- a module for obtaining a status, arranged to obtain an authentication status from the security module, said status being obtained by comparing the first one-time password with a second one-time password calculated by the security module by means of the secret key shared with the server, the status being positive if the first and second one-time passwords are identical, the status also being used by the security module for calculating the authentication message. The module for obtaining a status is arranged to execute step E56 of the method described above;
- a module for receiving and retransmitting a secret value, arranged to receive from the reader, and retransmit to the server, a secret value Val obtained by encrypting the authentication message and the authentication status by means of the session key.

The modules described above, and notably the first 105 and second 106 receiving modules and the sending module 107 are preferably software modules comprising software code instructions for the execution of those of the steps of the method for securing a transaction that are executed by the security application.

The invention therefore also relates to:
- a computer program comprising instructions for executing the method for securing a contactless transaction as described above, when this program is executed by a processor;
- a recording medium, readable by a reader on which the computer program described above is recorded.

The software modules may be stored in, or transmitted by, a data medium. This medium may be a hardware storage medium, for example a CD-ROM, a diskette or a hard disk, or a transmission medium such as a signal or a telecommunications network.

The invention also relates to a system for securing contactless transactions. The system comprises a mobile terminal as described above, and:
- the contactless reader 12 adapted for communicating via contactless interfaces with the security application of the mobile terminal. The reader is also adapted to carry out processing and comprises a payment module in the form of software code, comprising instructions for executing the steps of the payment application that are executed by the reader. The reader comprises:
  - a sending module, arranged to send the first value for determining the session key to the security application,
  - a receiving module, arranged to receive the second value for determining the session key,
  - a module for calculating the session key, arranged to calculate the session key on the basis of the first and second values for determining the session key.

The security system also comprises the remote server 13, adapted for storing at least one sensitive piece of data and/or function of the payment application. The server comprises:
- a sending module arranged to send the first value for determining the session key to the mobile terminal,
- a calculation and sending module, arranged to calculate the first one-time password and send it to the security application,
- a calculation module arranged to calculate the session key, a receiving and verification module arranged to receive and verify the authentication message.

The modules of the contactless reader and of the server respectively, as described above, are preferably software modules comprising code instructions for the execution of those of the steps of the method for securing a transaction that are executed by the contactless reader or by the server respectively.

The invention claimed is:

1. A method for securing a transaction of a contactless service, said service being stored in a mobile terminal, said transaction involving the mobile terminal, a contactless reader and a remote server, said remote server storing at least one sensitive piece of data and/or function of the service necessary for the execution of the transaction, said mobile terminal comprising a security module, said method being characterized in that the terminal also stores a contactless security application and in that it comprises the following steps, executed by the mobile terminal:
   receiving a first determination value and an identifier of said remote server which the contactless reader wishes to establish a secure session by the security application from the contactless reader,
   sending to said remote server the first determination value and receiving in response from said remote server a second determination value and a first one-time password, said first one-time password being sent to the security module,
   calculating by the security module a second one-time secret by means of a secret key shared with said remote server,
   calculating by the security module an authentication status by comparing the first one-time password with the second one-time secret, wherein said authentication status is positive when the first one-time password is equal to the second one-time secret, and negative in the contrary case,
   transmitting to the contactless reader, the second determination value and an authentication message,
   relaying to said remote server said authentication message encrypted by a session key, said encrypted message being received from the contactless reader and said session key being calculated by said remote server and the contactless reader from said first and second determination values,
   relaying by the security application exchanges between the contactless reader and said remote server during said secure session secured by said session key, when the remote server authenticates the security module via said encrypted message.

2. The method for securing a transaction as claimed in claim 1, further comprising:
   receiving from the contactless reader, and retransmitting to the remote server, a secret value obtained by the contactless reader by encrypting the authentication message and the authentication status by means of the session key.

3. The method for securing a transaction as claimed in claim 1, further comprising:
   receiving from the remote server a first signature calculated on the basis of at least one identifier of the security module and a signature key belonging to the remote server,
   sending said signature to the contactless reader,
   receiving from the contactless reader, and retransmitting to the remote server, a second signature calculated on the basis of at least the identifier of the security module and a signature key belonging to the remote server.

4. The method for securing a transaction as claimed in claim 1, wherein the first one-time password is calculated by the remote server by encrypting, by means of a secret key ($K_s$) shared by the security module and the remote server, a counter which is incremented at each session.

5. The method for securing a transaction as claimed in claim 1, comprising, if the exchanges between the contactless reader and the remote server are encrypted by means of the session key, the following steps:
   receiving from the contactless reader an information message belonging to the service and intended for a user of the mobile terminal, said message having been sent from the remote server to the contactless reader,
   displaying said message on a user interface of the mobile terminal.

6. The method for securing a transaction as claimed in claim 1, comprising, when the exchanges between the contactless reader and the remote server have been encrypted by means of the session key, the following steps:
   receiving from the service a piece of data input by a user of the mobile terminal, said piece of data having been requested by the remote server,
   sending the input piece of data to the contactless reader, said input piece of data being intended for transmission to the remote server.

7. A mobile terminal adapted for securing a transaction of a contactless service, said terminal storing said contactless service, said transaction involving the mobile terminal, a contactless reader and a remote server, said remote server storing at least one sensitive piece of data and/or function of the service necessary for the execution of the transaction, said terminal comprising a security module, said mobile terminal being characterized in that it stores a security application and in that it further comprises:
   first receiving means, arranged to receive a first determination value and an identifier of said remote server which the contactless reader wishes to establish a secure session from the contactless reader,
   second receiving means, arranged to send to said remote server the first determination value and receive in response from said remote server a second determination value and a first one-time password,
   first calculating means, arranged in the security module to calculate a second one-time secret by means of a secret key shared with said remote server,
   second calculating means, arranged in the security module to calculate an authentication status by comparing the first one-time password with the second one-time secret, wherein said authentication status is positive when the first one-time password is equal to the second one-time secret, and negative in the contrary case,
   sending means, arranged to send to the contactless reader the second determination value and an authentication message,
   first relaying means, arranged to relay to said remote server said authentication message encrypted by a session key, said encrypted message being received from the contactless reader and said session key being calculated by said remote server and the contactless reader from said first and second determination values,
   second relaying means, arranged to relay by the security application exchanges between the contactless reader and said remote server during said secure session secured by said session key, when the remote server authenticates the security module via said encrypted message.

8. A non-transitory computer-readable medium storing a computer program which is stored thereon and can be loaded into memory of a mobile terminal, the program comprising code instructions for executing steps of a method for securing a transaction of a contactless service, when the program is executed on said mobile terminal, said service being stored in a mobile terminal, said transaction involving the mobile terminal, a contactless reader and a remote server, said remote server storing at least one sensitive piece of data and/or function of the service necessary for the execution of the transaction, said terminal comprising a security module, said method being characterized in that the mobile terminal also stores a contactless security application and in that it comprises the following steps, executed by the mobile terminal:

receiving a first determination value and an identifier of said remote server which the contactless reader wishes to establish a secure session by the security application from the contactless reader, sending to said remote server the first determination value and receiving in response from said remote server a second determination value and a first one-time password said first one-time password being sent to the security module, calculating by the security module a second one-time secret by means of a secret key shared with said remote server, calculating by the security module an authentication status by comparing the first one-time password with the second one-time secret, wherein said authentication status is positive when the first one-time password is equal to the second one-time secret, and negative in the contrary case, transmitting the second determination value and an authentication message, relaying to said remote server said authentication message encrypted by a session key, said encrypted message being received from the contactless reader and said session key being calculated by said remote server and the contactless reader from said first and second determination values, relaying by the security application exchanges between the contactless reader and said remote server during said secure session secured by said session key, when the remote server authenticates the security module via said encrypted message.

* * * * *